Sept. 12, 1967  F. I. FLETCHER ET AL  3,341,813
MAGNETIC SENSOR DEVICE
Filed May 25, 1964  2 Sheets-Sheet 2
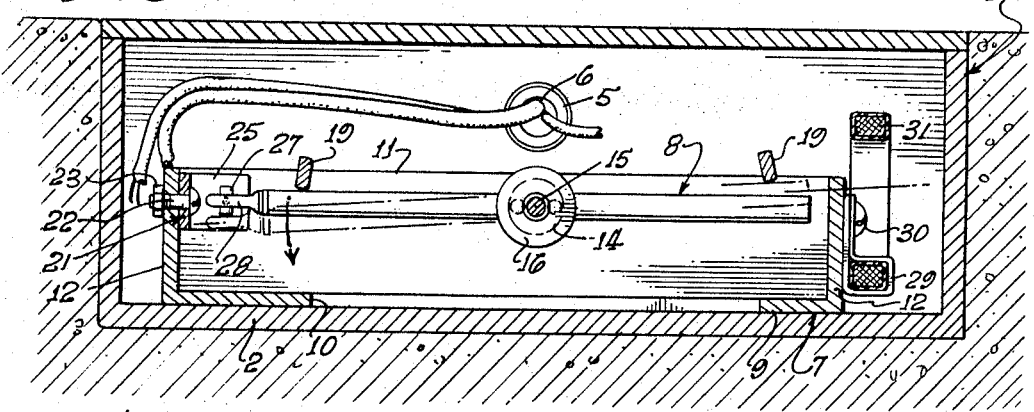
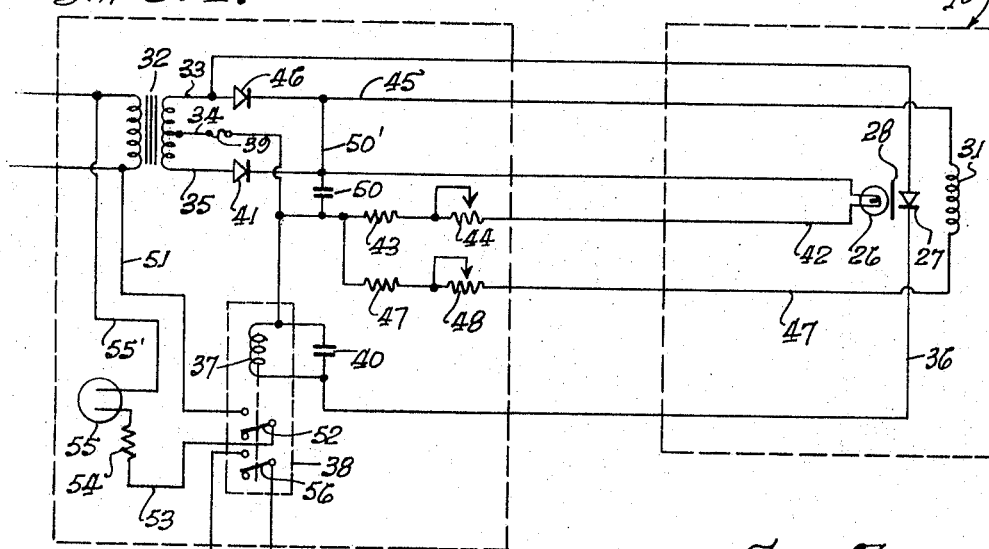
FRANKLIN I. FLETCHER,
RUSSELL J. O'NEILL,
INVENTORS.
BY
Harold J. Vescoute
ATTORNEY.

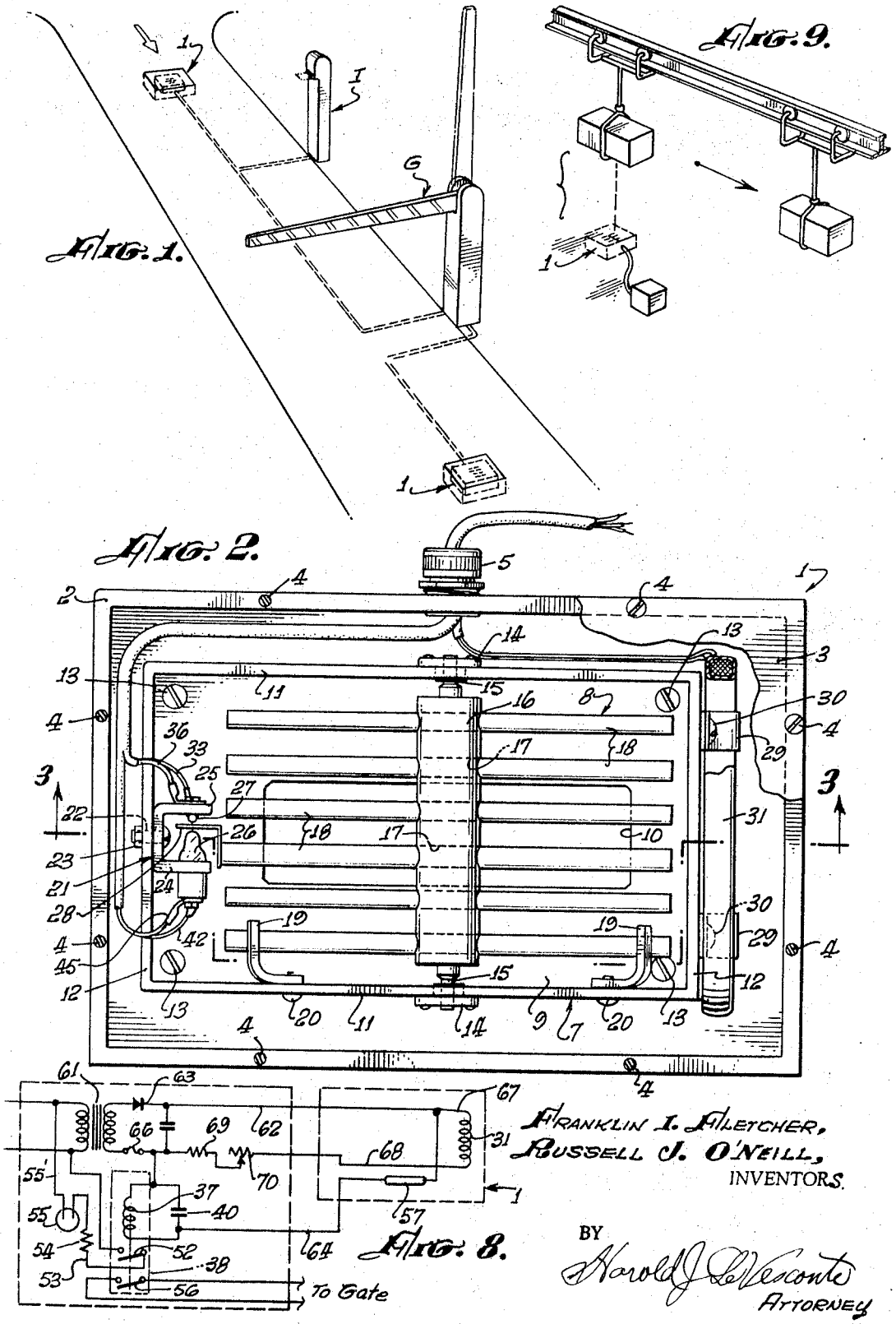

3,341,813
MAGNETIC SENSOR DEVICE
Franklin I. Fletcher and Russell J. O'Neill, Burbank, Calif., assignors to Security Controls, Inc., Burbank, Calif., a corporation of California
Filed May 25, 1964, Ser. No. 369,846
13 Claims. (Cl. 340—38)

This invention relates to sensing devices and more particularly to devices including a component creating a constant magnetic field and which component, in response to the presence of bodies which distort that field, is capable of pivotal movement in an effort to align the field thereof with the cause of the distortion and through such movement, effect control over an electric circuit or circuits.

An object of the invention is to provide a sensing and signaling device which maintains a magnetic field in a normal predetermined position and is capable of responding by movement to the momentary presence of a mass which distorts that field by movement of a part of the device tending to move the magnetic field from that normal position and into alignment with the distortion caused by the momentary presence of the activating mass.

Another object of the invention is to provide a magnetic type of sensor capable of emitting signals when a mass capable of distorting the field of the sensor passes within the range of the sensor.

A further object of the invention is to provide a magnetic sensor capable of responding to the passage of an automotive vehicle in close proximity thereto by emitting a signal effective to operate a counter or other mechanism.

A still further object of the invention is to provide a sensor device capable of responding to and the passage of vehicles in opposite directions and to actuate a counter or other device by such response.

With the foregoing objects in view, together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which drawings:

FIG. 1 is a schematic view of an entrance to a vehicle parking area in which two sensors embodying the present invention are installed to operate a ticket issuing and counting means and a gate means, FIG. 2 is an enlarged scale, top plan view of a sensor device constituting a first embodiment of the invention, a portion of the cover being broken away to disclose internal construction, FIG. 3 is a sectional side elevational view taken on the staggered line 3—3 of FIG. 2, FIG. 4 is a diagram of the electric circuitry of the embodiment shown in FIGS. 2 and 3, FIG. 5 is a reduced scale top plan view of a sensor device constituting a second embodiment of the invention, FIG. 6 is a sectional, side elevational view taken on the line 6—6 of FIG. 5, FIG. 7 is a greatly enlarged, longitudinal, medial sectional view of the magnetically responsive switch component of said second embodiment, FIG. 8 is a diagram of the electric circuitry of said second embodiment, and FIG. 9 is a semidiagrammatic perspective view showing either of the sensor devices constituting the illustrated embodiments of the invention employed as a counter actuating means adjacent to a conveyor.

Referring first to FIG. 1 there is shown a representative use of the sensor device at the entrance to a vehicle parking area with vehicles moving in the direction of the arrow shown in FIG. 1. Installed in cavities in the roadway are two of the sensors 1, 1 covered by removable cover lids. At the side of the roadway is a combined counter and ticket issuing means I and further along the roadway is a gate G swingable about a horizontal axis from a horizontal closed position to a vertical, open position. A vehicle entering the roadway is sensed by the first sensor which is caused to close an electrical circuit to actuate the ticket dispenser I to project a ticket out of a slot in a position to be pulled out of the slot by the driver. Taking the ticket actuates other devices to cause the gate G to move to open position and as the vehicle moves past the gate, it causes the second sensor to close another circuit which through devices actuated thereby, returns to gate to closed position. This invention is concerned with the sensors only and the foregoing description of the parking area gate means is by way of illustrating one typical use of the invention.

Next referring to FIGS. 2, 3 and 4, the first illustrated embodiment of the invention comprises a hollow, rectangular case 2 formed of non-magnetic material (preferably metallic) having a removable cover 3 secured thereon by screws 4 or equivalent means. One side wall of the case is provided with an aperture carrying a fitting 5 through which the electrical conductors enclosed within a flexible cable 6 extend into the case; the fitting 5 closely fitting the cable 6 to form a water tight seal therewith.

Disposed within the case 2 is the sensor apparatus comprising generally, a frame component 7 and a first magnetic field creating a sensor component 8. The frame component constitutes a non-magnetic metal element of shallow, rectangular box-like configuration of greater length than width and including a bottom wall 9 having a rectangular opening 10 extending therethrough, and further having side walls 11, 11 and end walls 12, 12. Screws 13 secure the frame component to the bottom of the case 2. The side walls 11, 11 adjacent the upper edges thereof and slightly offset from the midlength thereof for a reason to be presently referred to, are provided with axially aligned horizontal bearings 14, 14 for the journals 15, 15 carried by and projecting from opposite ends of a cylindrical body member 16 of the component 8 and disposed in the axial line of said body member. The body member 16 is provided with a plurality of laterally spaced, parallel transverse holes 17 extending therethrough and fixedly mounted one each in each of said holes is a plurality of elongated, cylindrical bar magnets 18 which combine with the body member 16 to form the sensor component 8, said bar magnets extending substantially equal distances from the opposite sides of the body member 16 so that the sensor component is in substantial static balance; said bars also being arranged so that the same poles are adjacent each other. Stop members 19, 19 comprising right angled arms releasably secured to the inner face of one of the side walls 11 of the frame component by screws 20 and overlying the opposite ends of the sensor component are rotatably adjustable about the axis of the mounting screws 20 to limit the extent of rocking movement of the sensor component 8.

The inner face of one of the end walls 12 of the sensor frame component carries a horizontally disposed, U-shaped bracket 21 secured thereon by a screw 22 and nut 23 said bracket including spaced parallel arms 24 and 25 projecting outwardly from the inner face of the end wall 12. The arm 24 carries a lamp 26 disposed at the side thereof adjacent the arm 25. The arm 25 carries a light sensitive semi-conductor 27 at the side thereof adjacent the arm 24 and one of the bar magnets 18 carries a light beam interrupting blade 28 movable in a path between the lamp 26 and the semi-conductor 27 so that when the sensor component is rocked to that extreme of its movement to which it responds in the presence of a magnetic field distorting mass, the light beam is allowed to impinge on the semi-conductor and at the other extreme of sensor movement the light beam will be prevented from impinging on the semi-conductor.

The bearings 14, 14 are so disposed that the ends of the magnet bars 18 of the sensor component are disposed sufficiently far from the end wall 12 which carries the bracket 21 to afford room for the bracket and this brings the opposite ends of the bar 18 relatively closer to the other end wall 12 as best shown in FIG. 2. Secured to the outer face of said other end wall 12 by clamps 29 and screws 30 is a second magnetic field creating means comprising a coil 31 of generally oval configuration disposed with the major axis thereof horizontal and in the horizontal plane of the axial line of the magnetic bars 18 when the sensor component 8 is in its normal position of repose.

Next, having regard principally for FIG. 4 the circuitry of the above described embodiment is illustrated. Operating power is supplied by a transformer 32 of which the secondary winding is provided with three leads 33, 34 and 35. The lead 33 extends to one side of the semi-conductor 27 and the lead 36 extends from the other side of the semi-conductor 27 to one side of the actuator coil 37 of a relay device 38 and the lead 34 extends to the opposite side of the coil 37, there preferably being a fuse 39 disposed in the lead 34. Also, a capacitor 40 is interposed between the leads 36 and 34 in parallel with the coil 37. Thus, when the semi-conductor 27 is rendered conductive by the impingement of light thereon, a circuit will be completed through the conductors 33, 34 and 36 and the coil 37 with resultant actuation of the relay 38.

The lamp 26 is energized by a circuit comprising the lead 35 which is connected to one side of the lamp and which has a rectifier 41 interposed therein and a lead 42 connected to the other side of the lamp and to the lead 34, there being a fixed resistance 43 and a variable resistance 44 interposed in said lead 42. The coil 31 is interposed in a circuit comprising a lead 45 extending from the lead 33 and having an interposed rectifier element 46. A lead 47 extends from the other side of the coil 31 to a connection with lead 42 at a point thereon between the resistances 43 and 44 and the juncture of said lead with the lead 34; said lead 47 also having a fixed resistance 48 and a variable resistance 49 interposed therein. A capacitor 50 is interposed in a lead 50' connecting the leads 33, 35 and 42.

The power leads connected to the primary coil of the transformer 32 are also connected to a signal lamp circuit comprising a lead 51 extending from one of the power leads to one side of a normally open switch means 52 forming a part of the relay 38 and a lead 53 extending from the other side of said switch means through a resistance 54 to a signal lamp 55 and a lead 55' extending from the signal lamp to the other power lead. Additionally, the relay 38 includes a normally open switch means 56 simultaneously operable to close or open the operating circuit of any device to be operated by the sensor such as a traffic gate or a ticket issuing device.

It will be noted from the circuit that the coil 31 is energized at all times but this energization is at a very low level and is sufficient only to insure that the sensor component will be maintained normally in the horizontal position shown in FIG. 3. Upon the approach of a vehicle, assuming that the sensor is installed as indicated in FIG. 1, the sensor component 8 will be caused to move to the inclined position shown in FIG. 3 against the slight bias of the field created by the coil 31, whereupon the blade 28 will allow light from the lamp to impinge on the semi-conductor 27. A current flowing through this semi-conductor will energize the relay coil 37 causing the switch devices operated thereby both to energize the signal lamp and to operate a circuit which may be that which operates a traffic gate, a counter or other devices. As soon as the vehicle is out of field distorting range of the sensor, the slight bias maintained by the field created by the coil 31 will insure that the sensor will return to its position of repose thus causing the blade 28 to interrupt the light beam with incident disablement of the relay device. At this point it may be well to note that while the device is shown with the sensor component moving about a horizontal axis, it will be evident that the device may be placed in any attitude which may be found convenient for the use for which it is intended and that although FIG. 2 has been described as a top plan view, it could equally well be a side elevational view with the axis of movement of the sensor component being disposed vertically.

Referring next to FIGS. 5, 6, 7 and 8, there is shown a second embodiment of the invention in which the light actuated means is supplanted by a magnetically responsive switch 57. A typical switch is shown in FIG. 7 comprising an enclosed elongated, non-conductive envelope 58 having conductors extending through the end walls thereof and within the envelope terminating in normally separated, overlying contact elements 59 and 60 at least one of said contact elements being resilient and being formed of a ferromagnetic material so that when subjected to a magnetic field in which the lines of force are non-parallel to that contact element, it will move into contact with the other element in opposition to the resilience thereof which normally holds them separated.

Referring now to FIGS. 5 and 6, all of the parts which are identical with the parts shown in FIGS. 2 and 3 have been given the same numbers as in those figures, wherefore, detailed description thereof need not be repeated. The stop members 19, 19 are adjusted to permit the sensor component 8 to have a greater range of pivotal movement from its normal horizontal position of repose and the magnetically responsive switch 57 is disposed in a horizontal position at the inner side wall 11 of the frame component adjacent to that end of the sensor component which moves toward the bottom of the frame component in response to the presence of a field distorting mass. Thus when the sensor component is moved into an angular position as shown in FIG. 6, the lines of magnetic force will cut through the switch device 57 closing the contacts thereof until the sensor re-assumes its normal horizontal position.

Having reference now to FIG. 8, one side of the secondary coil of the transformer 61 is connected by a lead 62 to one side of the switch 57 through an interposed rectifier 63 and a lead 64 extends from the other side of said switch to one side of the actuating coil 37 of the relay 38. The other side of the coil 37 is connected by a lead 65 to the other side of the transformer secondary coil through an interposed fuse 66. One side of the reset coil 31 is connected by lead 67 with the lead 62 at a point thereon between the rectifier means 63 and the switch 57 and a lead 68 connects the other side of the coil 31 with the lead 65 through fixed and variable resistances 69 and 70. The signal light means and the switch means operated by the relay 38 are identical with that shown in FIG. 4, wherefore, repetition of the description thereof is omitted.

When the sensor component 8 is moved to the inclined position as shown in FIG. 6, the lines of magnetic force extending parallel to the bars 18 will cut across the switch 57 causing the switch contacts to close and thus actuate the relay 38. When the sensor returns to its position of repose, the switch contacts open. As in the first embodiment, the reset coil is constantly energized to insure the return of the sensor component to its position of repose.

FIG. 9 is shown to indicate that the invention is not necessarily limited to automotive traffic and may be otherwise employed as, counting magnetic field distorting masses passing the sensor on a conveyor. Equally obviously, the sensor might be mounted on a vehicle or the like and operate various signals or devices as excited by proximity of magnetic field distorting masses to the vehicle on which it is mounted.

While in the foregoing specification there have been described certain presently preferred embodiments of the invention, the invention is not to be deemed to be limited to the specific details of construction thus disclosed by way of example and it will be understood that the invention includes as well all such changes and modifications in the parts and in the construction, combination and arrangement of parts as shall come within the purview of the appended claims.

We claim:

1. A sensor in the proximity of a mass capable of distorting a magnetic field, said sensor comprising in combination, a non-magnetic supporting means, a first magnetic field creating means mounted on said supporting means in a condition of substantial static balance for oscillatory movement about a horizontal axis, a second magnetic field creating means fixedly mounted on said supporting means constantly operative to tend to maintain said first magnetic field creating means in a predetermined position of repose, and other means including interacting, non-contacting component parts associated respectively with said supporting means and with said first magnetic field creating means, said interacting, non-contacting parts being effective, upon movement of said first magnetic field creating means in response to the proximity of a mass capable of distorting the field created by said first magnetic field creating means while in said position of repose, to create an electric signal indicating the proximity of a field distorting mass.

2. A sensor as claimed in claim 1 in which said first magnetic field creating means comprises a body member carrying a plurality of laterally spaced, physically and magnetically parallel, elongated, permanently magnetized bars extending substantially equal distances at opposite sides of said body member, and in which said supporting means and said body are provided with interengaging components constituting pivot means affording said oscillatory movement.

3. A sensor as claimed in claim 1 in which said second magnetic field creating means comprises an electromagnetic coil constantly, electrically conductively connected to a source of electrical energy and disposed adjacent to one end of said first magnetic field creating means, and means limiting the magnitude of current supplied to said coil to an amount at which the field created by said coil is ineffective to prevent mass proximity response of said first magnetic field creating means but effective in the absence of such response to return said first magnetic field creating means to its position of repose.

4. A sensor as claimed in claim 1 in which said parts of said signal creating means comprise a photo-responsive semi-conductor, means maintaining said semi-conductor in a nonconductive condition while said first magnetic field creating means is in said position of repose, and other means rendered effective by mass proximity response of said first magnetic field creating means to render said semi-conductor conductive.

5. A sensor as claimed in claim 1 in which said signal creating means comprises a signal producing electric circuit, a normally open, magnetically responsive switch in said circuit so positioned with respect to the magnetic field of said first magnetic field creating means as to be unaffected by the field when said first magnetic field creating means is in said position of repose and to be closed by the field of said first magnetic field creating means when said field creating means is caused to move in response to the proximity of a field distorting mass.

6. A sensor as claimed in claim 1 including adjustable stop means variable to determine the extent and the position of the limits of said oscillatory movement of said first magnetic field creating means.

7. A sensor as claimed in claim 3 in which said parts constituting said signal creating means are disposed adjacent the end of said first magnetic field creating means opposite said coil.

8. A sensor as claimed in claim 4 in which said signal creating means comprises a photocell and a constantly energized light source both carried by said non-magnetic supporting means adjacent to one end of said first magnetic field creating means with said light source spaced from and positioned to illuminate said photocell and in which said first magnetic field creating means carries a shutter element effective to shield said photocell from the light source only while said first magnetic field creating means is in said position of repose.

9. Means for controlling the actuation of vehicular traffic regulating devices said controlling comprising a sensor operable when placed in close proximity to a path of movement of vehicles to be subjected to regulation by said devices; said sensor comprising in combination, a non-magnetic supporting means adapted to be placed adjacent to a surface traversed by the vehicles, a first magnetic field creating means mounted on said supporting means in a condition of substantial static balance for limited oscillatory movement about a horizontal axis between a position of normal repose and a signal producing position assumed in response to a distortion of the field deriving from the proximity of a vehicle, a second magnetic field creating means constantly operative to tend to maintain said first magnetic field creating means in said position of repose, and means including relatively moving, electric current controlling, non-contacting component parts carried, respectively, by said supporting means and said field creating means operative upon vehicle proximity response of said first magnetic field creating means in opposition to the bias of said second magnetic field creating means to close an electric circuit with resultant production of an actuating impulse to a traffic regulating device so long as said response continues.

10. A control means as claimed in claim 9 in which said first magnetic field creating means comprises a body member carrying a plurality of laterally spaced, physically and magnetically parallel, elongated, permanently magnetized bars extending substantially equal distances at opposite sides of said body member, and in which said supporting means and said body are provided with interchanging pivot means affording said oscillatory movement.

11. A control means as claimed in claim 9 in which said second magnetic field creating means comprises an electro-magnetic coil constantly electrically conductively connected to a source of electrical energy and disposed adjacent to one end of said first magnetic field creating means and means limiting the magnitude of current supplied to said coil to an amount at which the field created by said coil is ineffective to prevent vehicle proximity response of said first magnetic field creating means but effective in the absence of such response to return said first magnetic field creating means to its position of repose.

12. A control means as claimed in claim 9 in which said parts of said circuit closing signal creating means comprise a photo-responsive semi-conductor, means maintaining said semi-conductor in a non-conductive condition while said first magnetic field creating means is in said position of repose, and other means rendered effective by vehicle proximity response of said first magnetic field creating means to render said semi-conductor conductive.

13. A control means as claimed in claim 9 in which said circuit closing, signal creating means comprises a signal producing electric circuit, a normally open, magnetically responsive switch in said circuit so positioned with respect to the magnetic field of said first magnetic field creating means as to be unaffected by the field thereof when said first magnetic field creating means is in said position of repose and to be closed by the field of said first magnetic field creating means when said first magnetic field creating means is caused to move in response to the proximity of a vehicle.

References Cited

UNITED STATES PATENTS

| | | | |
|---|---|---|---|
| 1,951,409 | 3/1934 | Havenner | 340—38 |
| 2,489,113 | 11/1949 | Veenstra | 340—38 |
| 2,575,650 | 11/1951 | Alexander | 340—38 |

NEIL C. READ, *Primary Examiner.*

THOMAS B. HABECKER, *Examiner.*